(12) United States Patent
Beil et al.

(10) Patent No.: US 6,819,474 B2
(45) Date of Patent: Nov. 16, 2004

(54) QUANTUM SWITCHES AND CIRCUITS

(75) Inventors: Ralph G. Beil, Marshall, TX (US); Kenneth Laine Ketner, Lubbock, TX (US)

(73) Assignee: Arisbe Tools, L.L.C., Lubbock, TX (US)

( * ) Notice: Subject to any disclaimer, the term of this patent is extended or adjusted under 35 U.S.C. 154(b) by 320 days.

(21) Appl. No.: 10/059,177

(22) Filed: Jan. 31, 2002

(65) Prior Publication Data

US 2003/0142386 A1 Jul. 31, 2003

(51) Int. Cl.[7] .............................. G02F 1/35; G02F 2/02; G02F 3/00
(52) U.S. Cl. ....................................... 359/326; 359/108
(58) Field of Search ................................ 359/326–332, 359/107–108

(56) References Cited

U.S. PATENT DOCUMENTS

| | | | |
|---|---|---|---|
| 4,783,605 A | 11/1988 | Tomisawa et al. | |
| 5,093,802 A | 3/1992 | Hait | |
| 5,530,263 A | 6/1996 | DiVincenzo | |
| 5,552,735 A | * 9/1996 | Kang et al. | 327/367 |
| 5,613,140 A | 3/1997 | Taira | |
| 5,629,549 A | 5/1997 | Johnson | |
| 5,644,123 A | 7/1997 | Hait | |
| 5,654,566 A | 8/1997 | Johnson | |
| 5,671,437 A | 9/1997 | Taira | |
| 5,783,840 A | 7/1998 | Randall et al. | |
| 5,793,091 A | 8/1998 | Devoe | |
| 5,838,436 A | 11/1998 | Hotaling et al. | |
| 5,847,565 A | 12/1998 | Narayanan | |
| 5,940,193 A | 8/1999 | Hotaling et al. | |
| 6,081,882 A | 6/2000 | Gossett | |
| 6,140,838 A | 10/2000 | Johnson | |
| 6,169,687 B1 | 1/2001 | Johnson | |
| 6,628,453 B2 | * 9/2003 | Ham | 359/326 |
| 2002/0015205 A1 | * 2/2002 | Ham | 359/139 |

OTHER PUBLICATIONS

"Quantum Switch", IBM Technical Disclosure Bulletin, vol. 31, No. 11, Apr. 1989, pp. 445–446.*
Zhang et al, "Quantum Switching And Quantum Secret Sharing Manipulated By Squeezed State Light", Quantum Electronics and Laser Science Conference 2001 (QELS '01) Technical Digest, paper No. QThA3, p. 171, May 10, 2001.*
"Photon Switch On Leading Edge Of More Powerful Computers", Press Release from University of Toronto, Toronto, Canada, Nov. 19, 2001, Sue Toye (press contact), 1 page.*

* cited by examiner

Primary Examiner—John D. Lee
(74) Attorney, Agent, or Firm—Jones, Tullar & Cooper PC

(57) ABSTRACT

Quantum switches, referred to as trisistors, operate on the basis of interactions between two elementary particles (EP), such as photons, electrons, phonons, etc. A first EP is used as a control input to the trisistor and interacts with a second EP, thereby inducing a detectable state change in the second EP that determines the trisistor's output value. The physical property which determines the particular EP state could be, for example, polarization, spin direction or energy level. The trisistors are connected primarily in series rather than in parallel as in previous quantum computing devices. The trisistors can be combined to form various types of logic gates, circuits, and other computer components. To implement the changes of state of the trisistors, one preferred embodiment employs nonlinear optics using a thin section of crystal.

32 Claims, 6 Drawing Sheets

QUANTUM SWITCHES AND CIRCUITS

BACKGROUND OF THE INVENTION

1. Field of the Invention

The present invention relates in general to switches and circuits incorporating the same, which operate through interaction of elementary particles, including electrons and photons, for example.

2. Description of the Background Art

The transistor was a huge breakthrough in the electronics industry when it was introduced some 40 years ago, and even today, continues to serve as the basic circuit element in all high speed computing devices, for example. However, as the demand for faster and faster computers increases, researchers continue to look for more efficient, higher speed switching devices. The transistor, even in its modern high tech forms, such as the variations on the FET, is still inherently limited by its fundamental theory of operation which relies upon the flow of electrons.

This has led to development of alternative forms of switches and devices that rely upon the particle theory of quantum mechanics for their operation in which interaction of elementary particles, such as electrons, photons and protons, is used to transfer information. These quantum devices are smaller than conventional FETs by several orders of magnitude and operate with minimal, quantum scale power input. However, up to now, quantum devices, such as quantum computers are intended to operate in a massively parallel manner in which the states of many particles known as qubits are used to transmit or store information, for example. As a result, the devices suffer from signal-to-noise ratio limitations and decoherence. More particularly, since information is contained in a large number of particles in parallel, corruption of even one particle's information can result in total loss of all the information. Further, these known devices work by setting and sensing the various states of the particles, such as electron spin direction, polarization, etc., which further exacerbates signal detection.

SUMMARY OF THE INVENTION

The present invention overcomes the drawbacks of previous quantum computing devices and logic circuits through provision of quantum switches and devices which operate on the basis of sequential, single particle interactions, thereby avoiding the decoherence problems assisted with multi particle, parallel systems. In its simplest form, the invention comprises a quantum switch referred to as a trisistor, which operates in a manner similar to that of a conventional transistor in which a control input determines the value of an output. However, unlike a conventional transistor, which relies on the flow of electric current for operation, the trisistor operates in response to interactions between pairs of elementary particles. More particularly, a first elementary particle (EP), such as a photon or an electron, is used as a control input to the trisistor and interacts with a second EP, thereby inducing a detectable state change in the second EP that determines the trisistor's output value. The physical property which determines the particular EP state could be, for example, polarization, spin direction or energy level, and would be binary in the simplest embodiment. In another embodiment, the state values could have more than two values. A good example would be the energy levels of an electron in an atom where many states are available.

In some embodiments of the invention, switches and circuits can be constructed that do not require setting or detection of specific particle state values, but instead, operate through control of a state of one particle relative to the state of another particle. For example, in one embodiment of the invention, a pair of photons is generated in response to an electron state change which can be set to have either the same or different photon polarizations. The actual polarization of the particles need not be known nor measured; instead, the device need only know whether the polarizations are the same or different.

The operation of the various embodiments of the invention is based on a triadic theory of particle behavior that the inventors have proposed. The inventors have given this theory and the method derived therefrom the name Peirce-Beil-Ketner (PBK). Under the novel point of view and application of the PBK method all interactions between elementary particles can be defined as a function of a history of each particle's quantum states both before and after the interaction between the two particles. The history of an EP as it interacts with other particles can therefore be defined graphically by a plurality of interconnected three legged diagrams, known as triads. Each triad represents the interaction of the EP with another EP. A first leg of the triad represents a quantum state of the particle before the interaction, a second leg is connected to the corresponding leg of the interacting particle and represents the interaction itself, and a third leg of the triad represents a quantum state of the particle after the interaction. Each triad thus forms what can be referred to as a quantum switch that behaves much like a conventional transistor by providing a variable output that is a function of an input particle's quantum state and the interaction. The inventors refer to this device as a trisistor since it can provide the same function as a transistor, but operates in accordance with their triadic particle theory and the PBK method.

Just as conventional transistors can be grouped together to form logic or computer circuits, the EP-based trisistors using the PBK method can be combined to form various types of logic gates, circuits and other computer circuits. A significant advantage of these circuits over previous quantum mechanics based computing circuits is that the subject circuits comprise a plurality of trisistors that operate in series with one another, thus eliminating the signal decoherence problem associated with previous multiple particle state, parallel devices.

To implement the trisistors, one preferred embodiment employs a thin section of nonlinear crystal, such as beta barium borate. In this embodiment, the device operates based on the control and detection of polarization states of elementary particles, in this case photons, emitted by the crystal. More particularly, in one operational embodiment, a UV photon is used as input in the device and is incident on the crystal at a controllable angle. The angle of incidence, which is controlled using conventional beam handling devices, such as mirrors or lenses, determines the output of the trisistor in the following manner. As the incoming photon impinges on the crystal, it interacts with an atomic electron in the crystal, thereby changing one of its states, in this case, its energy level. If the angle of incidence is properly selected, two IR photons will be emitted by the crystal as a result of a decrease in the electron's energy level. The operation of the crystal as a trisistor in all configurations is thus the interaction of incoming and/or outgoing photons with the atomic electrons of the crystal. In general, the dipole moments of the atoms interact with the polarization vectors of the photons. Depending upon the angle of incidence of the incoming UV photon on the crystal, two IR photons will be emitted by the crystal having either different or the same polarizations, a condition that can be readily prepared and subsequently detected without actually determining the polarizations of the IR photons.

The trisistors can be configured in various, complementary manners so that the devices can be combined together in series to form various types of logic gates or circuits. For example, a second embodiment of the trisistor operates in the inverse manner to generate an output UV photon if two incoming IR photons, which are highly correlated, are simultaneously incident on the nonlinear crystal. Thus, by combining this trisistor with the previously discussed trisistor, a logic gate function can be realized if one or more additional trisistors are employed to alter the polarization of one of the IR photons after it is generated by the first trisistor, but before it is detected by the second trisistor.

BRIEF DESCRIPTION OF THE DRAWINGS

The features and advantages of the present invention will become apparent from the following detailed description of a number of preferred embodiments thereof, taken in conjunction with the accompanying drawings, in which.

DETAILED DESCRIPTION OF THE PREFERRED EMBODIMENTS

Turning now to a more detailed consideration of the present invention, all embodiments of the invention operate on the basis of a triadic particle theory and PBK method that has been developed by the inventors and represents an extension into particle physics, of the graphical relational logic developed by Charles Sanders Peirce in the nineteenth century. This triadic method treats an elementary particle (EP) on the basis of a succession of sign relations in space-time. These sign relations are connected or "bonded" to represent a history of the particle.

Each triad has exactly three valency places or "legs" with the canonical aspects (one each) of Object (O), Representamen (R), and Interpretant (I). According to the PBK method the internal bonding which constitutes the history of the particle is always O to R. The external bonding which produces an interaction with another particle is always I to I.

The internal bonding will be described first. In this, the Object leg of one triad is bonded to the Representamen leg of an adjoining triad of the same EP. For a particle with mass, the space-time interval from one triad to the next is always time like. The time like property is preserved from one relativistic reference frame to another.

Figure 1:
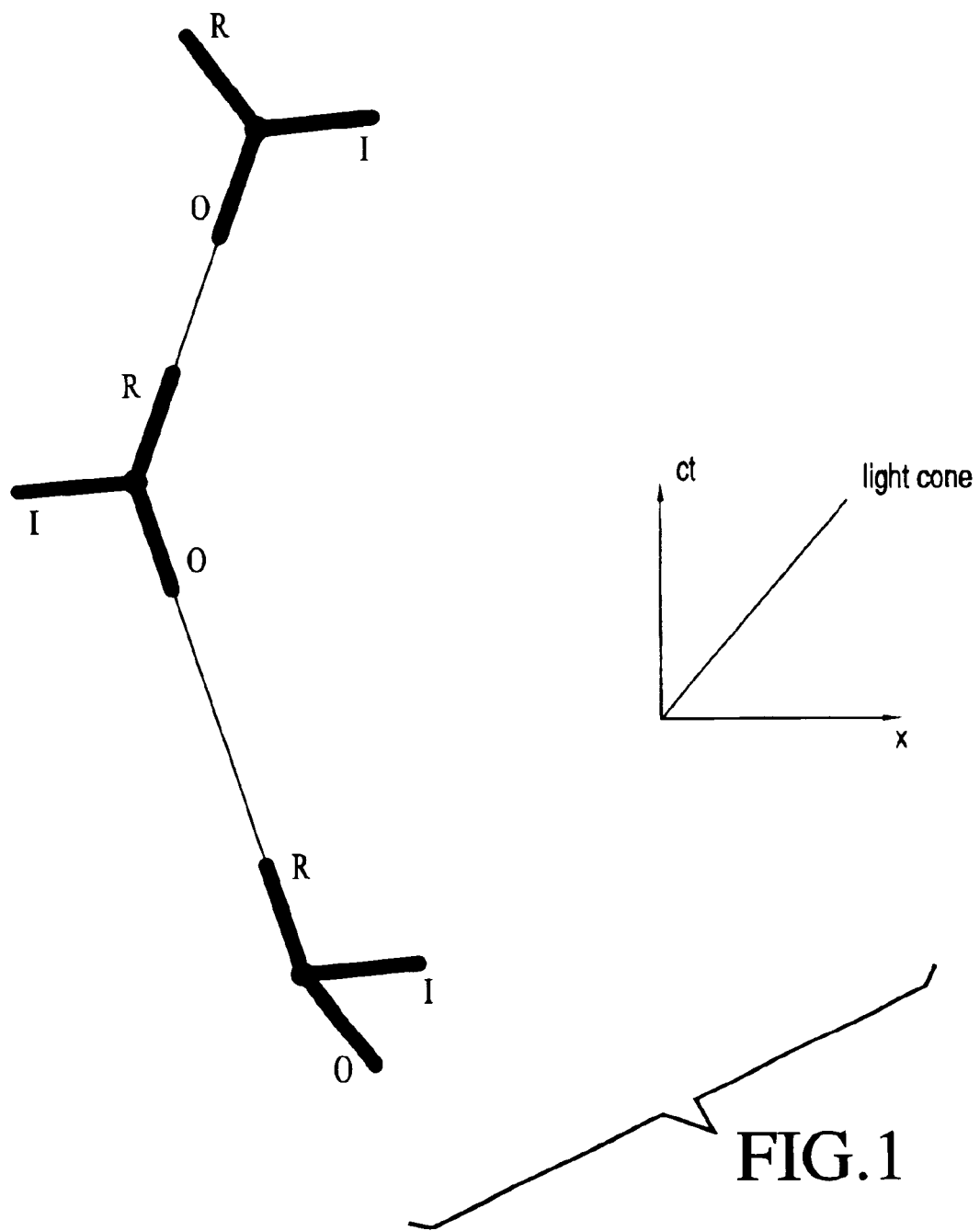
FIG. 1 is a schematic diagram illustrating the history of quantum states of an elementary particle as it interacts with other elementary particles.

For a normal particle (as opposed to antiparticle) the internal bonding is such that the R leg of any triad is bonded to the O leg of the next triad in time. FIG. 1 diagrammatically shows this history of a normal EP in a space-time coordinate system. For an antiparticle, the bonding is in the opposite sense such that the O leg of a triad is bonded to the R leg of the next triad.

For massless particles the space-time intervals from one particle triad to the next are null (on a light cone). The null property is preserved from one reference frame to another.

Within the principles of PBK the O-R bonding is treated as follows. The Object aspect means that the EP has an independent physical existence in each interval between interactions. The Representamen aspect means that the EP can be described mathematically in a given interval by a certain formal expression which is an element of some algebra. The O-R bonding then means that there is a mathematical expression or wave function which represents the physical nature of the EP even though the EP has no contact between interactions with the external world. In particular, certain properties such as charge, mass, and spin can be associated with this wave function.

Continuing with the PBK method, the Interpretant or I leg of each triad is bonded to an I leg of a neighboring triad which belongs to the history of a second EP. This external bond depicts the interaction of the two particles. The interaction takes place, as stated above, in a limited region of space-time. This is basically a scattering or contact interaction. Particles interact only when they are in each other's neighborhood. Further, the details of the interaction are determined by the impact parameter.

The significance within the PBK method of the external or I—I bonding in terms of Peirce's relational logic is that it is between Interpretants or, in more physical terms, between observers. Each particle observes or makes a measurement of the other. Each alters the state of the other and carries away an interpretation of the interaction.

Figure 2:
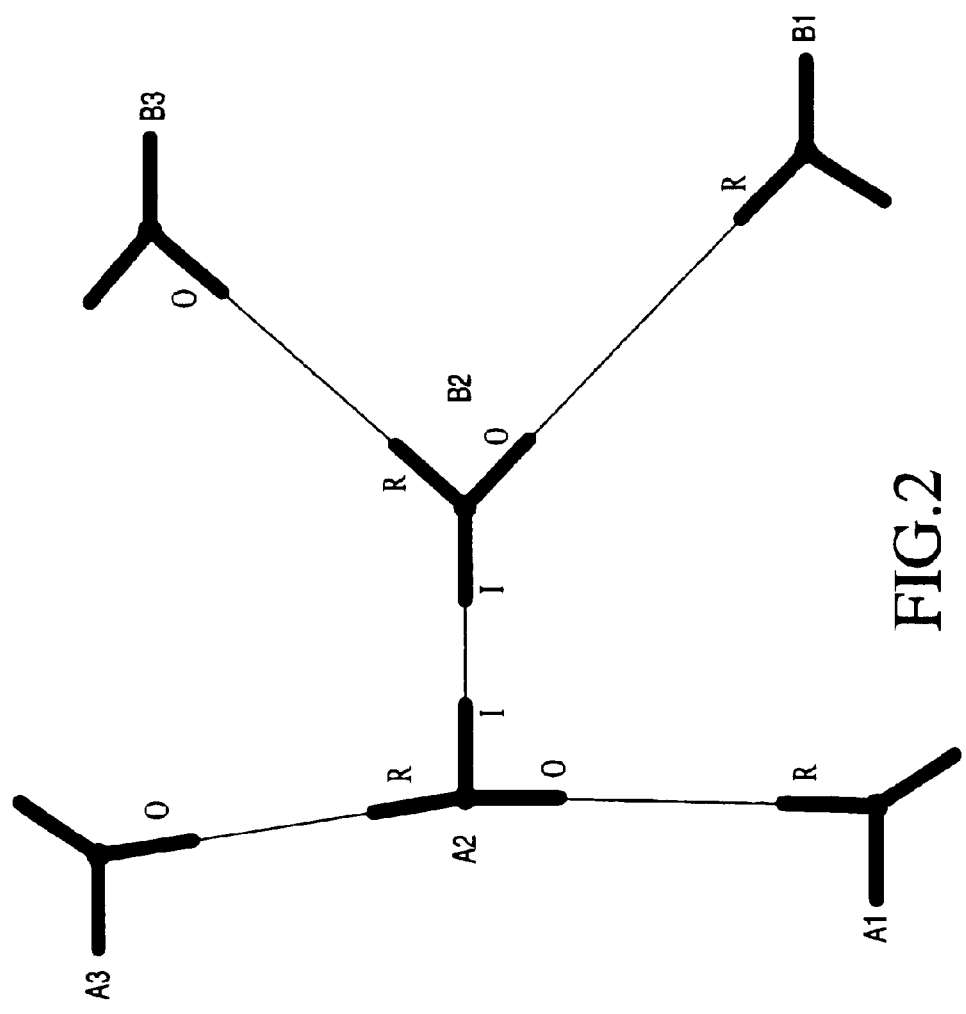
FIG. 2 is a quantum state diagram illustrating the interaction between two elementary particles.

A diagrammatic representation of the quantum state history interaction of two particles, say, an electron (EP-A) and a photon (EP-B) is illustrated in FIG. 2. For this particular case a physical process corresponding to the diagram would be Compton scattering. If one considers the interaction itself (A2–B2) in this diagram it is recognizable as a tetrad rather than a triad. It is not hard to see that any particle interaction diagram could be drawn with tetrads as the basic elements. This would emphasize the important role of interactions in the realm of elementary particles. However, the Completeness Principle of C. S. Peirce states that a tetrad is constructable from two triads. In the subject case all I—I bonds accomplish this. Thus, the triad components are emphasized in the PBK diagrams. The reason for this choice will be made clear in the following discussion of quantum correspondence. It should be noted that the Reduction Principle of Peirce forbids the construction of triads from dyads.

There is a direct correspondence of the Peirce relational logic by way of PBK to quantum mechanics. The internal intervals, represented by the O-R bonds, correspond to wave functions. These wave functions are solutions of an appropriate wave equation, for example, the Dirac equation for electrons or the Maxwell wave equation for photons. These wave functions can be written in standard Dirac notation as bras $<|$ or kets $|>$. For example, in FIG. 2 the wave function for the interval A1 to A2 can be written as the ket $|A1,A2>$ or the associated adjoint or bra $<A1,A2|$. The mathematical form of these wave functions can be the same as in standard quantum theory, however, the inventors assert that they can also refer to states of a single particle as an alternative to the standard interpretation of wave functions as implying averages over multiple states.

The expectation value is the usual $<A1,A2|A1,A2>$. This is not interpreted as a probability, but as an amplitude of a single-particle field density. In either case, though, there is a formal correspondence between the O-R bond, as it refers to a mathematical representation of the EP as it exists in the interval between triads, and the wave function.

The I leg of each tetrad corresponds to a matrix operator involving the quantum states which are connected through the triad. For example, in FIG. 2 at triad A2 the operator is $|A2,A3><A1,A2|$. This operator produces the transition $|A2,A3><A1,A2||A1,A2>=|A2,A3>$ from one ket state $|A1,A2>$ to the next, $|A2,A3>$. The same operator would take a bra state $<A2,A3|$ to a "previous" bra state $<A1,A2|$, that is, $<A2,A3||A2,A3><A1,A2|=<A1,A2|$.

The wave functions are assumed to be normalized. This implies that all expressions are integrated over appropriate spaces according to the usual practice.

Figure 3:
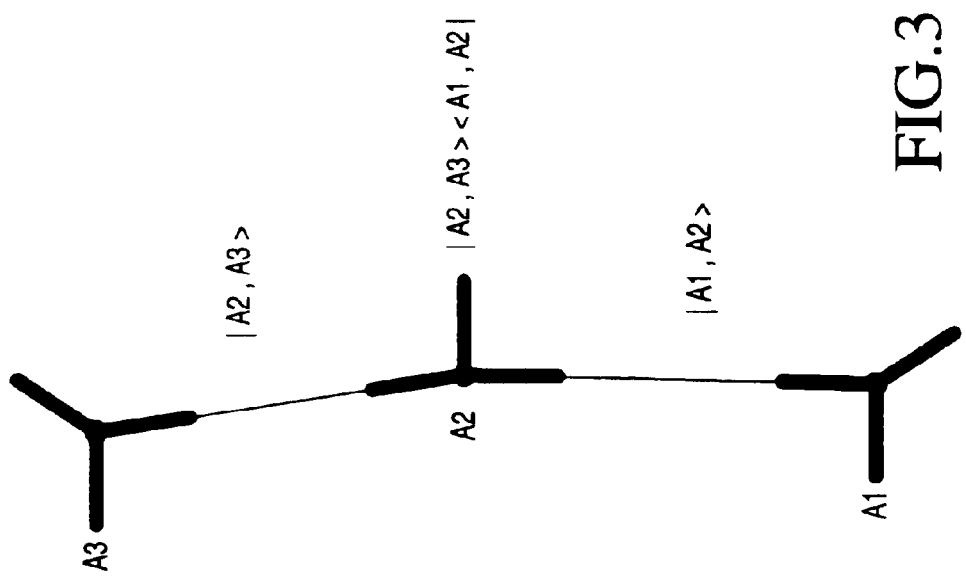
FIG. 3 is a schematic diagram illustrating the quantum history of an elementary particle.

The history of an EP has the quantum representation as shown in FIG. 3. The I—I bond in an interaction of two EP's then corresponds to the operator equivalence $|B2,B3><B1,B2|=E|A2,A3><A1,A2|$ where E is a constant. This meshes nicely with the quantum concept of operators as observables.

So the action of EP-B on EP-A is $|B2,B3><B1,B2||A1,A2>=E|A2,A3>$. This is a general type of expression for the action of a quantum operator on a wave function. The operator $|B2,B3><B1,B2|$ functions as a sort of element of an S-matrix. The outgoing states $|A2,A3>$, however, are not the usual spherical waves, but are wave bundles propagating along the physical path of a single particle.

There is an analogy here of the diagrams in FIGS. 1–3 to Feynman diagrams. For example, FIG. 2 looks like a lowest order Feynman diagram for Compton scattering. However, FIG. 2 represents a sum of all orders of Feynman diagrams applicable to this interaction and not just the process depicted in a Compton scattering diagram. Note that the sum used to obtain the diagram is a sum over component waves, for example, Brittingham waves and not the perturbation theory sum applied to Feynman diagrams.

The foregoing triadic theory and PBK method can be extended to apply to quantum logic and quantum computing. Specific models are proposed for implementation of computer logic on the quantum or elementary particle scale. It is emphasized, however, that by "quantum" the reference is not to multiparticle state models such as the "Feynman" computer, but to the single particle model of the foregoing triadic theory.

In this example, the interacting particles here are taken to be the electrons and photons. These are in a sense most fundamental, especially in the context of Quantum Electrodynamics. However, implementation using other particles or atoms is certainly possible and may be more favorable for experimental reasons.

One can think of a network of EP interactions as a "circuit" analogous to a conventional circuit with wires and circuit elements such as transistors. For an EP circuit the "wires" are EP's themselves moving along paths in space-time and the "transistors" are other EP's which change their quantum state as they interact with the wire EP's. The basic circuit using, say, electron-photon interaction can be represented by the PBK diagram of FIG. 4, which illustrates the particle interaction of a quantum switch that will be hereinafter referred to as a "trisistor," since the switch can be used in place of a conventional transistor, but involves the triadic interaction of two particles. These particles could be any type of EP or even atoms or molecules, but the simplest example of electrons and photons will be used in the following examples. The physical property which determines the particular EP state could be, for example, polarization, spin direction, or energy level. The state values could be binary, but could also have more than two values. A good example would be the energy levels of an electron in an atom where many states are available.

Figure 4:
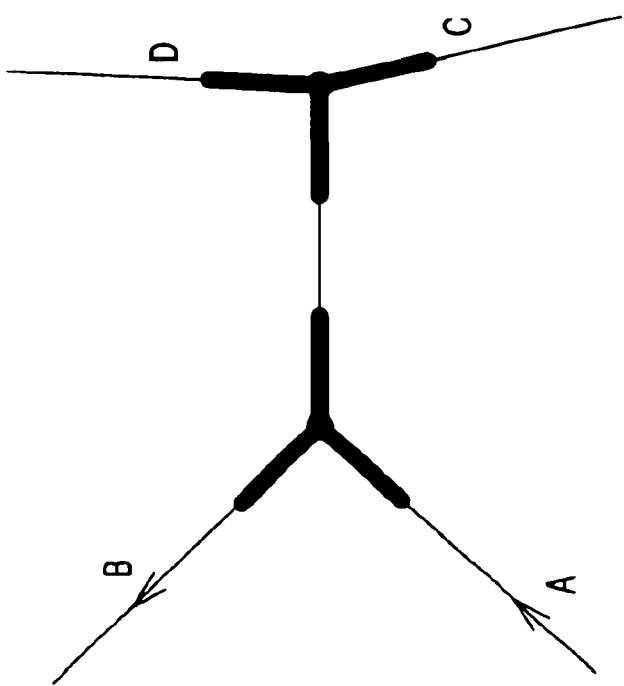
FIG. 4 is a quantum state diagram illustrating the electron-photon interaction in a first preferred embodiment of a trisistor that operates in accordance with the triadic theory and PBK method of the present invention.

With reference to FIG. 4, an incoming photon changes from state A to state B while an electron interacting therewith changes from state C to state D. Depending on how this circuit is "connected" externally, either the photon or the electron could play the role of wire while the other performs the function of the switching device or transistor. The interaction shown in FIG. 4 can be applied so that either the electron measures the change of state of the photon or vice-versa.

Figure 5:
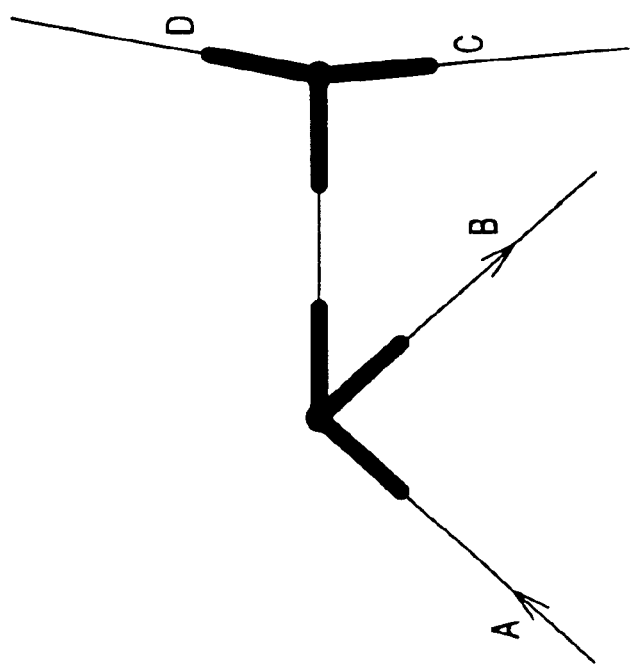
FIG. 5 is a quantum state diagram illustrating the electron-photon interaction in a second preferred embodiment of a trisistor that operates in accordance with the triadic theory and PBK method of the present invention.

In addition to the diagram of FIG. 4, there are three other configurations of the trisistor. One of these is illustrated in FIG. 5 in which a photon, A, annihilates an antiphoton, B, which causes a change of state of an electron from C to D. (The term "antiphoton" is used here in accordance with the name "antiparticle" for massive particles. The concept of an antiphoton traveling backward in time, as is applied to antiparticles, gives a plausible explanation of quantum action at a distance.) FIG. 5 is simply the absorption of radiation from two sources with a measurement of the relative states of A and B. Conversely, the photon A–B measures the change of state of the electron from C to D.

Figure 6:
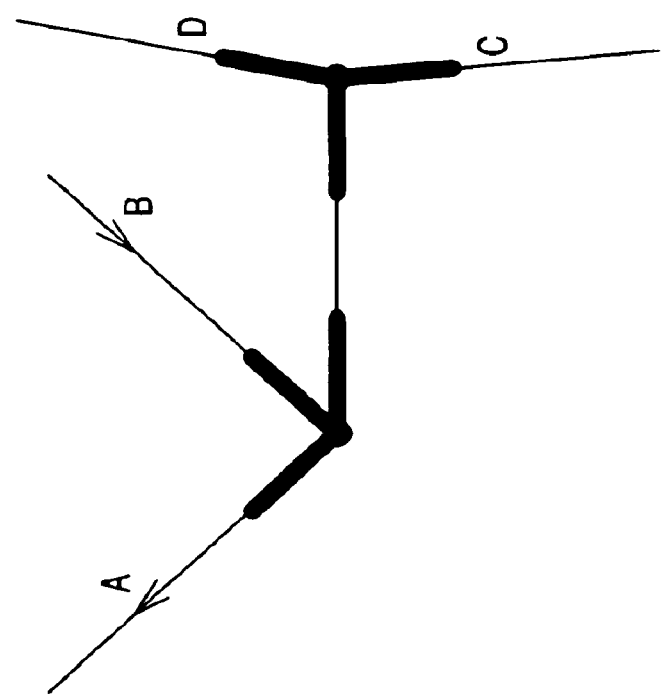
FIG. 6 is a quantum state diagram illustrating the electron-photon interaction in a third preferred embodiment of a trisistor that operates in accordance with the triadic theory and PBK method of the present invention.

In FIG. 6, the creation of a photon-antiphoton pair is illustrated. This is the emission of a correlated or "entangled" pair of photons A, B. Specifically, the states of the emitted photons could be the same or different. The relative values of the states are measured by the electron C-D. Conversely, the photon could measure the relative states of the electron.

Figure 7:
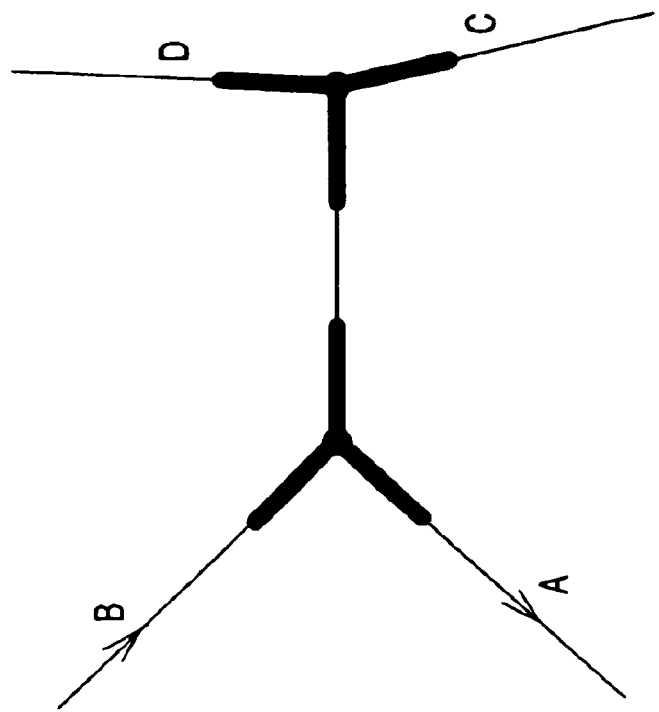
FIG. 7 is a quantum state diagram illustrating the electron-photon interaction in a fourth preferred embodiment of a trisistor that operates in accordance with the triadic theory and PBK method of the present invention.

A fourth embodiment of the trisistor is illustrated in FIG. 7, which shows a configuration that involves the change of state of an antiphoton. Again, either particle could be the one which makes the measurement. For example, most recent experiments which examine quantum information or quantum entanglement of particles use polarization states of photons as the input-output and electrons (or devices which apply electron-photon interactions) as shift registers or storage. The "quantum teleportation" experiments are an example. The experimental techniques for such devices are well developed and could be applied almost "off the shelf."

On the other hand, devices which use electron energy levels as input-output and photons as storage will perhaps be more useful in the long run. A larger number of distinguishable states is available and the input or output (photons of particular frequency and spin) is easier to handle. The experimental techniques are open for refinement. Possible implementing technologies for alternate embodiments include quantum dots, trapped ions, Nuclear Magnetic Resonance, and cavity quantum electrodynamics.

It should be understood that "storage" functions somewhat differently in quantum circuits than it does in conventional circuits. In classical logic the circuit element (e.g. transistor) is in a determined setting (on or off). This setting takes definite input states and converts them to definite output states. In quantum circuits the settings of the circuit elements are not known. What is known is the change of state which is produced by the element. Thus the quantum switch or trisistor, in the embodiments disclosed herein, performs one of the following operations: It produces a pair of particles with known relative polarization. Or, it measures the relative polarization of a pair of particles. Or, it changes the polarization of a particle by a certain amount. These are just the operations depicted in FIGS. 4–7. This type of measurement from the point of view of multiparticle states is sometimes called a Bell state measurement.

So, quantum circuits determine changes of states, not the absolute value of the states themselves. Thus, while a classical circuit element says to an input signal, "I will put you in a definite state," a quantum circuit element says, "I will change your state by a definite amount." This is why the Peircean triadic method is so suitable for quantum analysis. It focuses on the interaction of particles or the change produced by one on the other particle. In addition, since it is a method focused on single particles in interaction, it avoids the conceptual problems of the conventional probabilistic theory.

Figure 8:
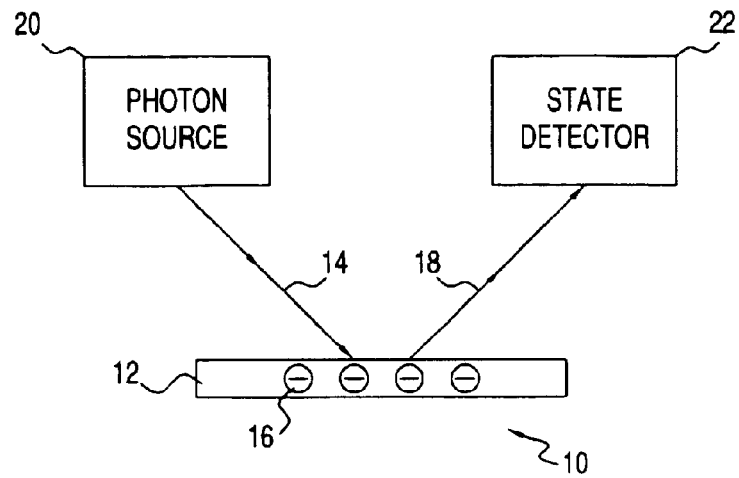
FIG. 8 is a schematic block diagram illustrating a trisistor structure that can be employed to implement any of the trisistors of FIGS. 4–7.

FIG. 8 illustrates a generalized structure of a trisistor 10 that can be employed to implement any of the foregoing or other embodiments of the trisistor. Structurally, the trisistor 10 is actually quite simple. To function, all that is needed is a material in which elementary particles can interact, an input for directing incoming particles into the medium, and an output for directing particles to some sort of detector element. In one preferred embodiment, the material consists simply of a thin section (on the order of millimeters or smaller) of nonlinear crystal 12 or multiple thin sections in contiguous layers. A typical material for the crystal 12 is beta barium borate. An alternate embodiment could make use of a waveguide type nonlinear device instead of the crystal 12 as the medium in which EP's interact.

As has been discussed in conjunction with FIGS. 4–7, the operation of the trisistor 10 in all configurations is based on the interaction of one or more incoming (or outgoing in the case of antiphotons) photons 14, which act as input to the trisistor 10, with the atomic electrons 16 of the crystal 12. This interaction causes a change in the state of the electron 16, and/or causes a change in polarization state of the incoming photon 14, either conditions of which can be detected as one or more output photons 18. In the first case, whenever the state of one of the electrons 16 is changed in a certain manner, either a UV photon or a pair of IR photons will be released as one or more output (again, incoming in the case of antiphotons) photons 18 which act as output for the trisistor 10. In the second case, the input photon 14 becomes the output photon 18, except with a state, e.g., polarization, change. In general, the dipole moments of the atoms in the crystal 12 interact with the polarization vectors of the photons. The particulars of this interaction are well understood theoretically and confirmed by experiment In this embodiment of the trisistor circuit the photon polarization states (more correctly, the differences in polarization of those states) store and contain the internal computer logic information. The electron states perform the input-output function and receive or transmit information to the external environment. It should be made clear that a peculiarity of this embodiment is that the means of exchanging information from the electrons 16 in the crystal 12 to the external environment is also photons. These input-output photons are external to the gate system and are typically in the ultraviolet (UV) frequency range whereas the internal logic photons are in the infrared (IR) frequency range. In fact, the UV input-output photons have exactly double the energy of the IR logic photons.

FIG. 8 also illustrates several other elements that are not actually part of the trisistor 10 itself, but are necessary for implementation of the device. These include a photon source 20, which may be a laser for external UV photons or another trisistor for internal IR photons, for example, and generates the input photons 14. A state detector 22, which could either be a polarization detector in the case of a UV photon output or another trisistor in the case of a two-IR photon output, is employed to determine the output value of the trisistor 10.

Figure 9:
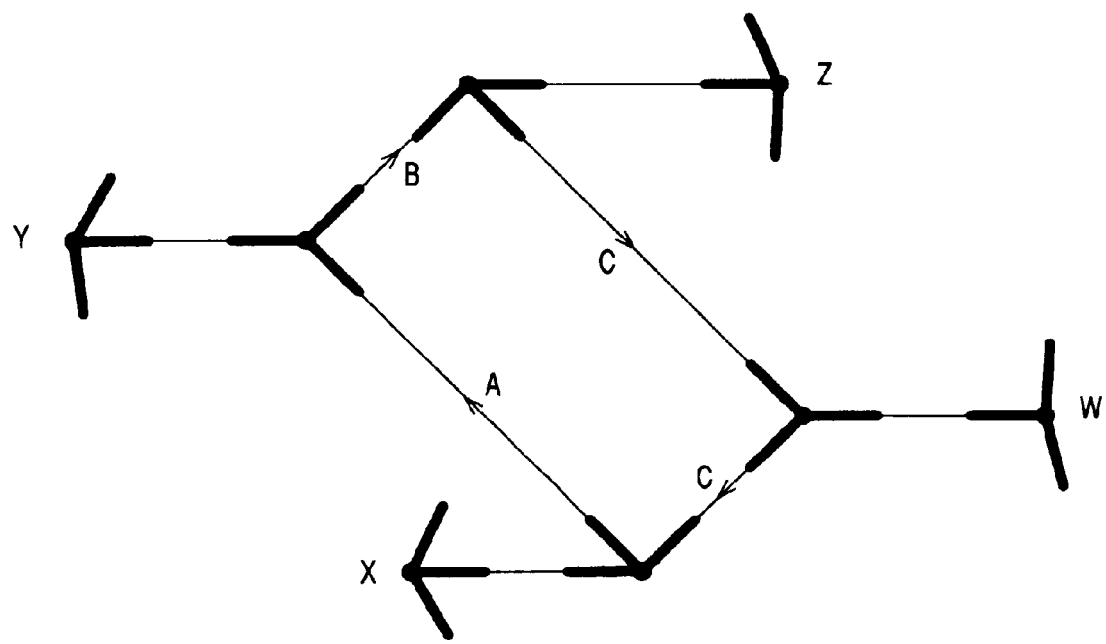
FIG. 9 is a quantum state diagram illustrating the electron-photon interaction in a logic circuit constructed using the trisistors of FIGS. 4–7.
Figure 10:
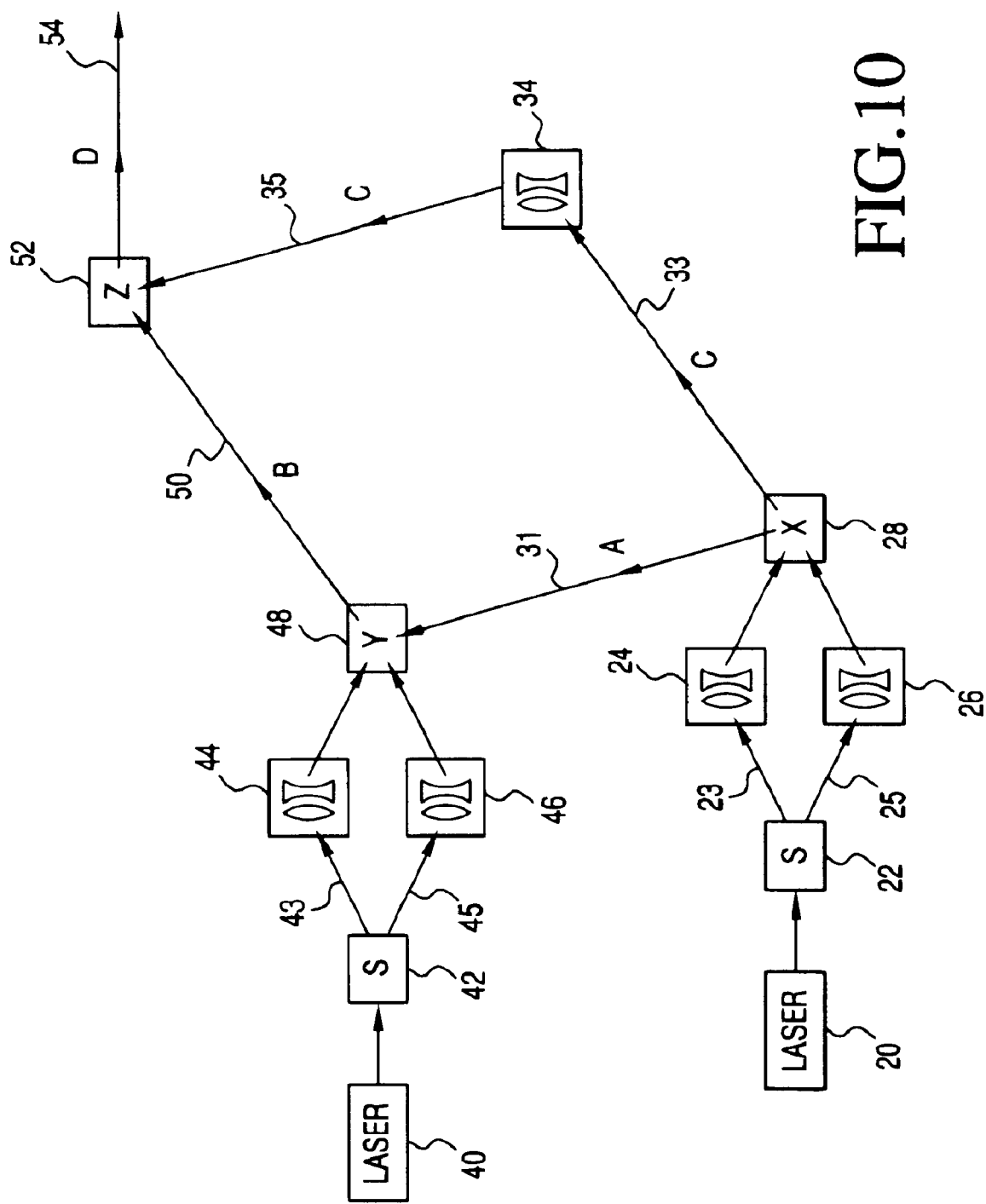
FIG. 10 is a schematic block diagram illustrating a preferred embodiment of the logic circuit of FIG. 9.

The basic configurations of the trisistor that are illustrated in FIGS. 4–7 can, just like conventional transistors, be configured into groups that form logic circuits, or the like. The quantum state diagram for one such example is illustrated in FIG. 9, while a schematic block diagram of the actual elements employed to implement the circuit is illustrated in FIG. 10. This example uses photon polarization states as input-output, although it should be understood that the circuit could easily be reconfigured to use other quantum states, such as electron energy levels or electron spin direction, as input-output.

With reference to FIG. 9, the triads X, Y, Z, and W represent electrons interacting with the photon states A, B, and C. The photons A and B are going forward in time; the photon C can be thought of as going backward in time. During operation of the circuit, the sequence of events is as follows:

1. System X emits an entangled pair of photons A and C. A has a known polarization (a certain angle) relative to C. This is the input value due to X.

2. System Y interacts with A and changes it to a state B which has a known polarization relative to A. This is the input value due to Y.

3. Meanwhile, the direction of photon C has been changed by system W (which might, for example, be a mirror) without changing C's polarization.

4. System Z measures the relative polarization of B and C. The resulting state of Z is the output of the circuit.

It should be noted that the direction change of C is necessary so that C can appear at Z at the same space-time event as the arrival of B at Z. In addition, regarding terminology, if C is actually an antiphoton going backward in time then the pair creation or "emission" of A and C at X is actually the emission of A and the absorption of C. Similarly, the pair annihilation or "absorption" of B and C at Z is the absorption of A and the emission of C. This is consistent with terminology used for advanced radiation by, for example, Wheeler and Feynman.

If only two polarization states are used, the possible input and output state differences can only be two-valued, say, s (same) and d (different). The "truth table" in this case is:

| X | Y | Z (Output) |
|---|---|---|
| s | s | s |
| s | d | d |
| d | s | d |
| d | d | s |

The output of the circuit is automatically determined by the two inputs and does not require additional internal processing of the output.

For three possible polarization state differences, labeled now 0, 1, and 2, the table is:

| X | Y | Z |
|---|---|---|
| 0 | 0 | 0 |
| 0 | 1 | 1 |
| 0 | 2 | 2 |
| 1 | 0 | 1 |
| 1 | 1 | 2 |
| 1 | 2 | 0 |
| 2 | 0 | 2 |
| 2 | 1 | 0 |
| 2 | 2 | 1 |

This is exactly a 3-element modular sum. It is clear that addition with higher numbers of elements is possible. This 3-element table can easily be adapted to function as either a binary adder or as one of the standard logic gates.

To implement the various embodiments of the trisistor and logic circuits formed therefrom, the interaction or physical transmission of information between the trisistor components of this circuit proceeds according to distinct and well known processes. However, the actual rationale for interconnection of these elements such as to produce logic circuits is novel and is a particular consequence of the triadic PBK method.

Perhaps the easiest trisistor configuration to understand is that of FIG. 6. The operative physical process in this case is called Parametric Down-conversion. A photon from an external UV laser (sometimes called a pump photon) strikes the center of a nonlinear crystal. Under optimum conditions a pair of IR photons of exactly half the frequency of the incident UV photon emerge from the crystal with wave vectors at certain solid angles. The relative polarization of the two IR photons is determined by the polarization and incident angle of the UV photon. Modes of operation can be Type I, where the two IR polarizations are parallel, or Type II, where the polarizations are perpendicular. The perpendicular case is commonly used in experiments involving quantum "entanglement."

The choice of incident photon angle with respect to the crystal can be accomplished by standard beam manipulation devices which are positioned so that one configuration produces Type I phase matching and a second configuration produces Type II phase matching. Switching between the two configurations could be implemented by a computer-controlled micro-actuator or by an electro-optic modulator. The switching could be controlled by a quantum signal generator with a correlation time shorter than the cycle time of the system.

The trisistor configuration of FIG. 5 is, in a sense, the complement of the previous configuration. Two coherent IR photons are simultaneously incident on the nonlinear crystal and produce a single UV photon of exactly twice the frequency of the incident pair. This process is known as Second Harmonic Generation. The relative polarization of the IR photons determines the resulting electron state which in turn determines the polarization and wave vector of the UV photon.

The trisistor configurations of FIGS. 4 and 7 are the same except for the time direction of the IR photons; so the two configurations will be discussed together. In both cases an incident internal IR photon from another trisistor, for example, produces a change of electron state in the crystal and causes a new photon to exit the crystal with a certain polarization relative to that of the incident photon. The configuration can be operated in what is called the "no pump" mode where there is no UV or external photon. This mode could be useful for beam handling or for producing a fixed change of polarization in a logic IR photon.

There is a second mode of operation for this configuration, however, which allows real time input into the relative polarization of the two IR photons. In this mode there is an incident UV photon which arrives at the crystal simultaneously with the incident IR photon and contributes a controllable change of polarization to the logical photon. The UV photon should then exit the crystal with a wave vector consistent with the conservation of four-momentum.

The logic circuit of FIG. 9 applies the trisistor configurations identified above. In general, the trisistors can be used as building blocks for this or many other circuits which perform computer logic functions. FIG. 10 illustrates a block diagram for implementing the circuit of FIG. 9 using a plurality of the trisistors 10 in FIG. 8. Photons from a first UV laser 20 are directed by a computer-controlled switching device 22 along one of two paths. In one path 23 a first configuration of appropriate beam handling components 24, such as lenses or mirrors, directs the photons so that they impinge on a nonlinear crystal 28 in a first input trisistor X with the proper polarization and angle of incidence to produce Type I phase matching in the crystal 28. In a second path 25, a second configuration of beam handling components 26 is arranged to produce Type II phase matching in the crystal 28.

By the process of Parametric Down-conversion, for each input UV photon the crystal 28 of the trisistor X produces two IR photons A and C of one-half the energy of the original photon, which travel along first and second paths 31 and 33, respectively. For Type I configuration, photon A has the same polarization as photon C. For Type II configuration, the polarization of photon A is perpendicular to that of photon C. The two possible cases (polarization same or different) are the two values of the logical input for the trisistor X.

The photon C is then directed by a third configuration of beam handling components 34 such that it travels along a third path 35. Meanwhile, photons from a second UV laser 40 are directed by a computer-controlled switching device 42 along one of two paths. In one path 43 a fourth configuration of appropriate beam handling components 44 directs the photons so that they impinge on a second nonlinear crystal 48 of a second input trisistor Y with the proper polarization and angle of incidence to produce Type I phase matching in the crystal 48. In a second path 45, fifth configuration of appropriate beam handling components 46 is arranged to produce Type II phase matching in the second crystal 48. In both configurations the photon is timed so that it arrives at the second crystal 48 (the trisistor Y) simultaneously with the A photon.

In contrast with the first input trisistor X, however, the second crystal 48 is oriented such that the input UV photon from the second laser 40 is not converted to two IR photons, but exits the second crystal 48 without loss of energy. This UV photon can interact, however, with the IR photon A. If the Type I beam configuration has been chosen, the polarization of a resulting IR photon B traveling along a fourth path 50 is the same as that of the photon A. If the Type II beam configuration has been chosen, the polarization of the resulting photon B is perpendicular to that of A. The two possible cases (polarizations same or different) are the two values of the logical input from the trisistor Y.

The second input trisistor Y can also operate in the "no pump" mode where no UV photon is introduced. The polarization change of the IR photon B relative to A is determined by the angle of incidence of A. This angle could also be subject to manipulation by beam handling operations.

The photons B and C are directed so as to arrive simultaneously at a third nonlinear crystal 52 of an output trisistor Z and in proper phase to produce a UV output photon D on an output 54 by the process of Second Harmonic Generation. The polarization of the UV photon D is the logical output of the circuit and can be applied as input to the next logic stage.

Although the invention has been disclosed in terms of a number of preferred embodiments and variations thereon, it will be understood that numerous additional variations and modifications could be made thereto without departing from the scope of the invention as defined in the following claims. For example, while the embodiments described above utilize components operating with "one-time" inputs, that is, a single sequence of trisistor functions, an alternate embodiment could use successive repetition of the same operational parameters as many times as is necessary to achieve reliable results. Thus, the signal-to-noise of a single cycle might be improved according to the number of photon trial repetitions. These repetitions could be computer controlled and could be accrued either in time or by the use of circuits in tandem.

What is claimed is:

1. A quantum switch comprising:
    a medium containing at least a first elementary particle;
    a control input for receiving at least a second elementary particle and causing said second elementary particle to interact with said first elementary particle, thereby changing a state of at least one of said elementary particles; and
    an output for conveying a state change of at least one of said first and second elementary particles;
    wherein, said first elementary particle comprises a first electron and said second elementary particle comprises a first photon.

2. The quantum switch of claim 1, wherein said change of state comprises a change of state of said electron.

3. The quantum switch of claim 2, wherein said change of state of said electron causes emission of at least a second photon on said output.

4. The quantum switch of claim 3, wherein said first photon is a UV photon that is incident on said medium at a controllable angle, and said change of state of said electron causes emission of first and second IR photons on said output, said IR photons having polarizations that are either the same as one another or different from one another, depending on the angle of incidence of said UV photon, whereby, the angle of incidence of said UV photon can be used to control the output value of said switch.

5. The quantum switch of claim 1, wherein said at least a second elementary particle comprise first and second IR photons.

6. The quantum switch of claim 5, wherein said change of state comprises a change of state of said electron.

7. The quantum switch of claim 6, wherein said change of state of said electron causes emission of a UV photon on said output.

8. The quantum switch of claim 1, wherein said medium comprises a nonlinear crystal.

9. The quantum switch of claim 8, wherein said crystal is beta barium borate.

10. A switching circuit comprising:
    a first quantum switch having a control input for receiving at least a first elementary particle, a medium containing at least a second elementary particle for interaction with said first elementary particle, and an output for conveying a state change of a least one of said first and second elementary particles resulting from said interaction; and
    a second quantum switch having a control input connected to said output of said first quantum switch for receiving at least a third elementary particle, a medium containing at least a fourth elementary particle for interaction with said third elementary particle, and an output for conveying a state change of a least one of said third and fourth elementary particles resulting from said interaction.

11. The switching circuit of claim 10, wherein said first elementary particle comprises at least a first photon, said third elementary particle comprises at least a second photon, and said second and fourth elementary particles each comprise first and second electrons, respectively.

12. The switching circuit of claim 11, wherein said state change in each of said quantum switches comprises a change of state of said first and second electrons.

13. The switching circuit of claim 12, wherein said at least one photon in said first quantum switch is a first UV photon that is incident on said medium at a controllable angle, and said change of state of said electron causes emission of first and second IR photons on said output of said first quantum switch, said IR photons having polarizations that are either the same as one another or different from one another, depending on the angle of incidence of said first UV photon, whereby, the angle of incidence of said first UV photon is used to control the output value of said first quantum switch; and, said first and second IR photons also comprise said at least one photon in said second quantum switch; whereby, said first and second IR photons cause a change of state in said electron in said medium of said second quantum switch, thereby generating a second UV photon as output from said second quantum switch, said second UV photon having a polarization that is dependent on the angle of incidence of said first UV photon on said medium of said first quantum switch.

14. The switching circuit of claim 13, further comprising a third quantum switch for receiving said first IR photon from said output of said first quantum switch and selectively changing the polarization of said first IR photon before supplying said first IR photon as input to said second quantum switch, whereby, said switching circuit comprises a logic gate with said control input of said first quantum switch and a control input of said third quantum switch serving as first and second inputs to said logic gate and said output of said second quantum switch serving as an output of said logic gate.

15. The switching circuit of claim 14, further comprising a fourth quantum switch for receiving said second IR photon from said output of said first quantum switch and reflecting said second IR photon without changing its polarization before supplying said second IR photon as input to said second quantum switch to insure that said first and second IR photons arrive at said input of said second quantum switch at the same time.

16. The switching circuit of claim 10, wherein said medium of said first and second quantum switches comprises a nonlinear crystal.

17. The switching circuit of claim 16, wherein said crystal is beta barium borate.

18. A method for providing a switching function comprising the steps of:
   providing a first medium containing at least a first elementary particle comprising a first electron;
   causing a second elementary particle comprising a first photon to interact with said first elementary particle as a switching input, thereby changing a state of at least one of said elementary particles; and
   employing said state change of at least one of said first and second elementary particles as a switching output.

19. The method of claim 18, wherein said change of state comprises a change of state of said electron and said change of state of said electron causes emission of at least a second photon as an output.

20. The method of claim 19, wherein said first photon is a UV photon and said step of causing said UV photon to interact with said electron comprises causing said UV photon to be incident on said medium at a selected angle, whereby said change of state of said electron causes emission of first and second IR photons as output, said IR photons having polarizations that are either the same as one another or different from one another, depending on the angle of incidence of said UV photon, whereby, the angle of incidence of said UV photon can be used to control a value of said switching output.

21. The method of claim 18, wherein said second elementary particle is selected to be first and second IR photons.

22. The method of claim 21, wherein said change of state comprises a change of state of said electron and said change of state of said electron causes emission of a UV photon on said output.

23. The method of claim 18, wherein said medium is selected to be a nonlinear crystal.

24. The method of claim 23, wherein said crystal is selected to be beta barium borate.

25. A method for operating a quantum switch-based switching circuit comprising the steps of:
   providing a first quantum switch having a control input, an output and a medium containing at least a first elementary particle;
   providing a second quantum switch having a control input, an output and a medium containing at least a second elementary particle, said first quantum switch output being connected to said control input of said second quantum switch;
   receiving at least a third elementary particle on said control input of said first quantum switch and causing said third elementary particle to interact with said first elementary particle, thereby changing a state of at least one of said first or third elementary particles and generating at least a fifth elementary particle on said output of said first quantum switch;
   receiving said at least fifth elementary particle on said control input of said second quantum switch and causing said fifth elementary particle to interact with said second elementary particle, thereby changing a state of at least one of said second or fifth elementary particles and generating at least a sixth elementary particle on said output of said second quantum switch; and
   detecting a state of said sixth elementary particle to determine an output value of said first quantum switch.

26. The method of claim 25, wherein said first and second elementary particles are each selected to be first and second electrons, respectively, and said third, fifth and sixth elementary particles are each selected to be at least a first, second and third photon, respectively.

27. The method of claim 26, wherein said changes of state comprise a change of state of said first and second electrons, respectively.

28. The method of claim 27, wherein said at least a first photon in said first quantum switch is a first UV photon, and said step of causing said third elementary particle to interact with said first elementary particle comprises causing said at least first photon to be incident on said medium at a controllable angle, thereby change of state of said first electron and causing emission of first and second IR photons on said output of said first quantum switch, said IR photons having polarizations that are either the same as one another or different from one another, depending on the angle of incidence of said first UV photon, whereby, the angle of incidence of said first UV photon is used to control the output value of said first quantum switch; and, said first and second IR photons also comprise said at least second photon that is received on said control input of said second quantum switch; whereby, said first and second IR photons cause a change of state in said second electron in said medium of said second quantum switch, thereby generating a second UV photon as output from said second quantum switch, said second UV photon having a polarization that is dependent on the angle of incidence of said first UV photon on said medium of said first quantum switch and can thus be used to determine an output value of said first quantum switch.

29. The method of claim 28, further comprising the steps of:
   providing a third quantum switch having a control input, an output and a medium containing at least a seventh elementary particle;
   receiving said first IR photon from said output of said first quantum switch on said control input of said third quantum switch; and
   selectively changing the polarization of said first IR photon with said third quantum switch before supplying said first IR photon as input to said second quantum switch, whereby, said switching circuit comprises a logic gate with said control input of said first quantum switch and said control input of said third quantum switch serving as first and second inputs to said logic gate and said output of said second quantum switch serving as an output of said logic gate.

30. The method of claim 29, further comprising the steps of:
   providing a fourth quantum switch having a control input, an output and a medium containing at least an eighth elementary particle;

receiving said second IR photon from said output of said first quantum switch on said control input of said fourth quantum switch and reflecting said second IR photon without changing its polarization before supplying said second IR photon as input to said second quantum switch to insure that said first and second IR photons arrive at said input of said second quantum switch at the same time.

31. The method of claim 27, wherein said medium of said first and second quantum switches is selected to be a nonlinear crystal.

32. The method of claim 31, wherein said crystal is selected to be beta barium borate.

* * * * *